Nov. 23, 1943.  J. T. ROFFY  2,334,791
ATTACHMENT FILTER
Filed March 4, 1941
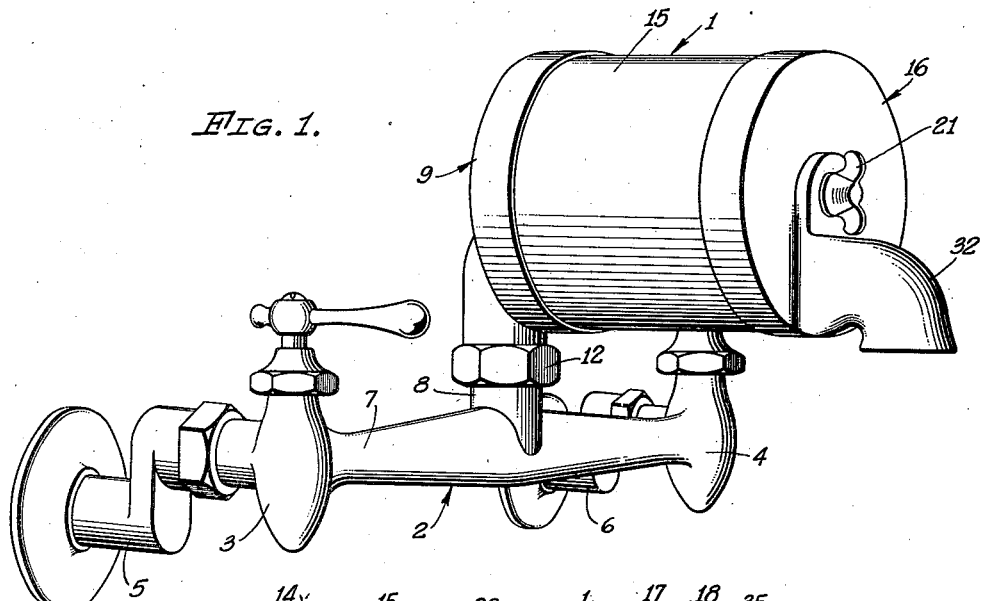
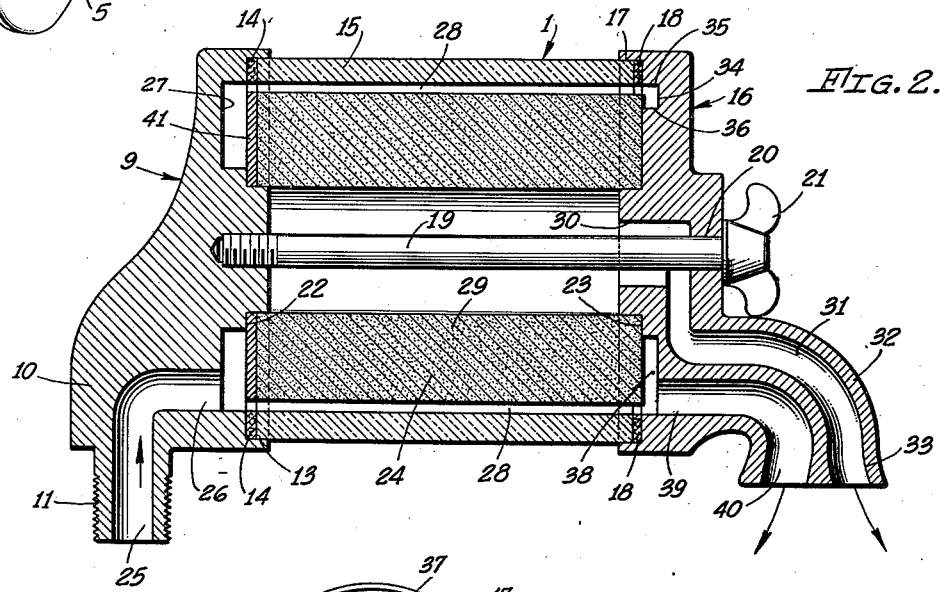
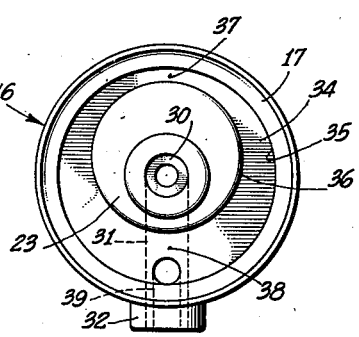
JOSEPH T. ROFFY,
INVENTOR:
BY *Harold W. Mattingly*
ATTORNEY Patented Nov. 23, 1943

2,334,791

UNITED STATES PATENT OFFICE 2,334,791

ATTACHMENT FILTER

Joseph T. Roffy, Los Angeles, Calif., assignor of one-half to Abraham Rothenberg, Los Angeles, Calif.

Application March 4, 1941, Serial No. 381,650

2 Claims. (Cl. 210—112)

My invention relates to filters and has particular reference to a self-cleaning filter for liquids peculiarly adapted for attachment to conventional faucets or for substitution in place of the spout portion of such faucets.

Prior to my invention considerable difficulty has been encountered in the use of conventional types of filters due to the clogging of the filter element. Such clogging results from the fact that the water or other liquid being filtered is caused to pass through a porous material having pores of such small size that foreign material in the liquid is prevented from passing through the filter material. An accumulation of such foreign material thus rapidly builds up on the surface of the filter element and in the outer pores thereof and seriously impedes the flow of liquid through the filter. When this condition obtains, it is necessary to remove the filtering element from the filter and clean the same. This is an unpleasant and dirty task and one which is oftentimes put off until the dirt is so firmly packed and worked into the pores of the filter element as to nearly defy removal and necessitate replacement with a new element. Unfortunately, the conditions which give rise to the greatest need for adequate filtering likewise give rise to the necessity for frequent cleaning of the filter element.

Another difficulty encountered with the present constructions is that of attaching the filter to existing piping installations, this now requiring a reconstruction and re-organization of the existing piping in order to accommodate the filter.

It is, therefore, an object of my invention to provide a filter for removing solid material from liquids which is so constructed and arranged as to permit its ready attachment to existing piping installations and particularly at the point where the liquid is normally withdrawn from such piping systems.

It is also an object of my invention to provide a filter construction of the character set forth in the preceding paragraph which may be attached to conventional faucet constructions in place of the usual spout.

It is an additional object of my invention to provide a filter of the character set forth in the preceding paragraphs which is inherently self-cleaning so that it is not necessary to dismantle the filter for the purpose of cleaning the filtering element.

It is a still further object of my invention to provide a filter construction which defines two paths of flow of liquid, one through a porous filter element whereby solid matter is removed from the liquid, and another over the surface of the filter element whereby solid matter normally tending to collect on the surface of the element is washed away.

It is also an object of my invention to provide a filter of the character set forth in the preceding paragraphs in which the separate streams of liquid are separately discharged but adjacent to each other so that a receptacle may readily be placed in a position to catch either filtered liquid or unfiltered liquid, or both, as desired.

Other objects and advantages of my invention will be apparent from a study of the following specification, read in connection with the accompanying drawing, wherein:

Fig. 1 is a perspective view illustrating the appearance and preferred manner of installation of a filter constructed in accordance with the preferred embodiment of my invention;

Fig. 2 is a longitudinal sectional view through the filter illustrated in Fig. 1; and Fig. 3 is an elevational view illustrating the construction embodied on the inner surface of the spout defining member of the filter.

Referring to the drawing, I have illustrated in Fig. 1 a filter 1 as being installed on a conventional type of faucet 2. This form of faucet includes a pair of valves 3 and 4 connected to hot and cold water supply lines 5 and 6, the discharge sides of the valves 3 and 4 being interconnected by a conduit 7 from the center of which rises a boss 8 to which the usual swing spout is normally attached.

In accordance with the preferred mode of installing the filter of my invention, the spout is removed and the filter is attached to the boss 8 in lieu thereof. For this purpose the filter 1 includes an end plate member 9 which is preferably formed of cast metal and includes a downwardly extending boss 10. The boss 10 is preferably turned and externally threaded as indicated at 11 to permit its being threadedly engaged with internal threads normally formed on the boss 8. Suitable packing may be clamped into sealing relation between the bosses 8 and 10 by means of a packing nut 12.

The forward face of the end plate 9 is recessed as at 13 to receive a cork washer 14 or other suitable packing material against which is placed an outer cylindrical housing 15 preferably formed of glass or other suitable transparent material. The housing 15 may be secured in place by providing a front cap member 16, the inner face of which is recessed as at 17 to receive a gasket or packing 18 against which the forward end of the housing 15 bears.

The cap member 16 may be secured to the end plate member 9 in such manner as to clamp the housing 15 between the gaskets 14 and 17 as by securing to the end plate member 9 an outwardly extending stud 19 which is passed through a suitable opening 20 formed in the front cap member 16 to receive a cap nut or wing nut 21 which may be employed to draw the cap member 16 toward the end plate 9 to thereby secure the housing 15 in place.

The end plate 9 and the cap member 16 are also preferably recessed as indicated at 22 and 23, respectively, to receive a cylindrical filter element 24 formed of a suitable porous material, carbon being found to be eminently suitable for this purpose.

The end member 9 is provided with a fluid passage comprising the bore portion 25 axially aligned with the boss 10 and communicating with a laterally directed bore 26 which in turn communicates with an annular recess 27 formed in the forward face of the end plate 9. Fluid received from either of the valves 3 or 4 is thus conducted into the annular space 27 from which it is directed into a narrow annular space 28 disposed between the inner surface of the cylindrical housing 15 and the outer surface of the cylindrical filtering element 24. Fluid which passes through the porous filter element 24 is collected within an interior bore 29 provided in the filtering element 24. This bore communicates with an axially extending passage 30 formed in the cap member 16, which passage 30 also communicates with a discharge passage 31 formed in a spout portion 32. The spout portion 32 is preferably formed integrally with the cap member 16 and is of such shape as to permit the passage 31 being directed downwardly and forwardly as indicated at 33 so that fluid ejected therefrom will be ejected in a generally downward and forward direction.

The annular space 28 disposed between the housing 15 and the filter element 24 also communicates with an annular recess 34 formed in the inner face of the cap member 16. As is illustrated in Fig. 3, the recess 34 is defined by circular walls 35 and 36, the former of which is formed concentrically with the axis of the cap member 16, whereas, the latter is formed eccentrically relative thereto so as to provide a minimum width of recess 34 at the point 37 and a maximum width thereof at the point 38. This variable width of the recess 34 is provided for the purpose of inducing substantially uniform flow of liquid through the annular space 28, the widest portion 38 of the recess 34 communicating with a second fluid passage 39 formed in the spout member 32.

The fluid passage 39 is preferably directed downwardly and rearwardly as indicated at 40 so that the stream of liquid discharged therefrom will diverge from the stream discharged through the spout opening 33.

The outside diameter of the filter element 24 is so adjusted relative to the inside diameter of the housing 15 as to provide an annular space 28 therebetween of such dimensions that the normal flow of liquid over the filter element 24 will be at a relatively high velocity, sufficient at least to dislodge any particles of solid matter tending to collect on the exterior surface of the filter element and wash such solid particles into the recess 34 and thence through the passage 39—40 and out of the filter.

It is not intended that the passage 28 provide a great resistance to flow of fluid therethrough, but just sufficient to cause a substantially equal division of the liquid supplied through the supply passage 25, approximately half of the liquid being employed for the purpose of washing the exterior surface of the filter element 24 and approximately half being passed through such filter element to be discharged through the discharge passage 31—33 as filtered liquid.

It will thus be seen that the filter of my invention is inherently self-cleaning, foreign matter tending to collect on the outer surface of the filter element 24 being washed away instead of collecting on the surface.

Furthermore, the adjacent disposition of the discharge passages 33 and 40 permits a receptacle to be so placed beneath the spout 32 to receive only filtered liquid issuing from the passage 33 or only unfiltered liquid issuing from the passage 40, as desired. Obviously a receptacle may conveniently be so placed as to receive liquid issuing from both the passages 33 and 40.

I have found that when carbon is employed as the filtering material, the filtering action may be improved and the tendency of extremely small particles of foreign matter to lodge within the pores of the filter element and eventually clog the same may be reduced by interposing between the inner end of the filter element 24 and the end plate member 9 an annular disk 41 of silver. It is believed that the improved operation results from a galvanic action occurring between the silver, the water and the carbon.

From the foregoing it will be observed that I have provided an extremely simple and inexpensive filter construction which is so arranged as to permit its ready attachment to a conventional form of faucet in place of the spout usually provided on such faucet construction.

Attention is also directed to the fact that the construction above described permits the filter to be readily dismantled in case it is required to replace the filter element 24 or for the purpose of cleaning, if desired, such dismantling being accomplished by merely removing the wing nut 21 whereupon the entire assembly may be readily taken apart.

It should be noted that by dividing the incoming stream of liquid into two streams, one of which is caused to pass through the filter element and the other of which is caused to sweep at a high velocity over the surface of the filter element, I have provided a filter which, in addition to providing an adequate supply of filtered liquid, is also inherently self-cleaning so as to either entirely eliminate or at least materially reduce the frequency with which such element must be cleaned.

While I have shown and described the preferred embodiment of my invention, I do not desire to be limited to any of the details of construction shown or described herein, except as defined in the appended claims.

I claim:

1. In a liquid filter, the combination of: a tubular filter housing; an end plate member closing one end of said housing and a cap member closing the other end of said housing, said members each having an annular recess formed in the inner face thereof adjacent the walls of said housing; means for drawing said members toward each other to secure said housing therebetween; a tubular filter element secured between said members in such position as to divide the space within said housing into an inner cylindrical space and a relatively narrow outer annular space communicating with said annular recesses; an inlet connection formed on said end plate member having a passage formed therein communicating with said annular recess; and a spout formed on said cap member having a pair of passages formed therein, one communicating with said cylindrical space within said element, and the other communicating with said annular recess, whereby liquid supplied through said inlet is divided, a part being filtered by passing through said element and a part passing at a sufficient velocity over the surface of said element to clean the same, the annular recess in said cap member being defined by a radial bottom wall and two axial cylindrical side walls formed on said cap member, one of said side walls being concentric with said outer annular space and the other of said side walls being eccentrically located relative thereto so as to provide a progressively varying width of recess which is greatest at the junction with said other outlet passage and least at a point farthest therefrom, whereby the flow of liquid over the surface of said element is at a uniform velocity.

2. In a liquid filter, the combination of: a tubular filter housing having both ends closed; a tubular filter element of porous carbon in said housing; means mounting said element in such position as to divide the space within said housing into an inner cylindrical space and a relatively narrow outer annular space; an inlet for conducting liquid to be filtered to said outer annular space; an outlet for filtered liquid communicating with said inner cylindrical space; another outlet communicating with said outer annular space at the end opposite said inlet, whereby liquid is caused to flow over the outer surface of said element, a part passing therethrough and being discharged as filtered liquid and a part being discharged through said other outlet to carry away solid matter normally tending to collect on the outer surface of said element; and a metallic silver member disposed in contact with said carbon filter element and exposed to said liquid in said outer annular space, whereby sticking of solid matter to the outer surface of said element is inhibited by galvanic action involving the liquid, the carbon filter element and the metallic silver element.

JOSEPH T. ROFFY.